United States Patent [19]
White et al.

[11] Patent Number: 5,199,072
[45] Date of Patent: Mar. 30, 1993

[54] METHOD AND APPARATUS FOR RESTRICTING ACCESS WITHIN A WIRELESS LOCAL AREA NETWORK

[75] Inventors: Richard E. White, Cary; Lee Hamilton, Jr., Palatine, both of Ill.

[73] Assignee: Motorola, Inc., Schaumburg, Ill.

[21] Appl. No.: 829,206

[22] Filed: Feb. 3, 1992

[51] Int. Cl.$^5$ .............................................. H04L 9/00
[52] U.S. Cl. ........................................ 380/44; 380/45; 380/47; 380/50
[58] Field of Search ................... 380/44, 45, 47, 50

[56] References Cited

U.S. PATENT DOCUMENTS

| | | | |
|---|---|---|---|
| 4,502,232 | 5/1985 | Wilson | 380/50 |
| 5,008,938 | 4/1991 | Freeburg et al. | 380/50 |
| 5,016,274 | 5/1991 | Miculi et al. | 380/50 |
| 5,093,860 | 3/1992 | Steinbrenner et al. | 380/50 |

Primary Examiner—Salvatore Cangialosi
Attorney, Agent, or Firm—Val Jean F. Hillman

[57] ABSTRACT

User module (12) access capabilities are provided within a wireless Local Area Network (LAN) having distinct user groups (1-3). In this effort, a password is entered into a UM (12) seeking access within a user group (1-3). In response to the password, the UM (12) selects a key and a polynomial from memory (20). Thereafter, packets received by and transmitted from the UM (12) are encrypted, by encryption circuit (52), with the selected key and polynomial. Communictions is permitted if the UM selected key and polynomial are identical to those used by the user group CMs (10). Alternatively, the key is generated as a function of the password, while a polynomial is selected from memory (20).

20 Claims, 5 Drawing Sheets

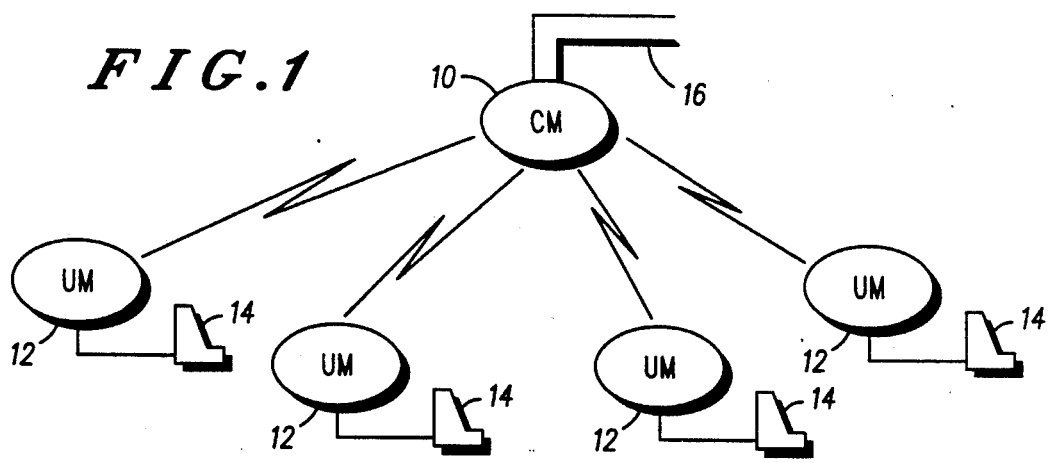
FIG.1
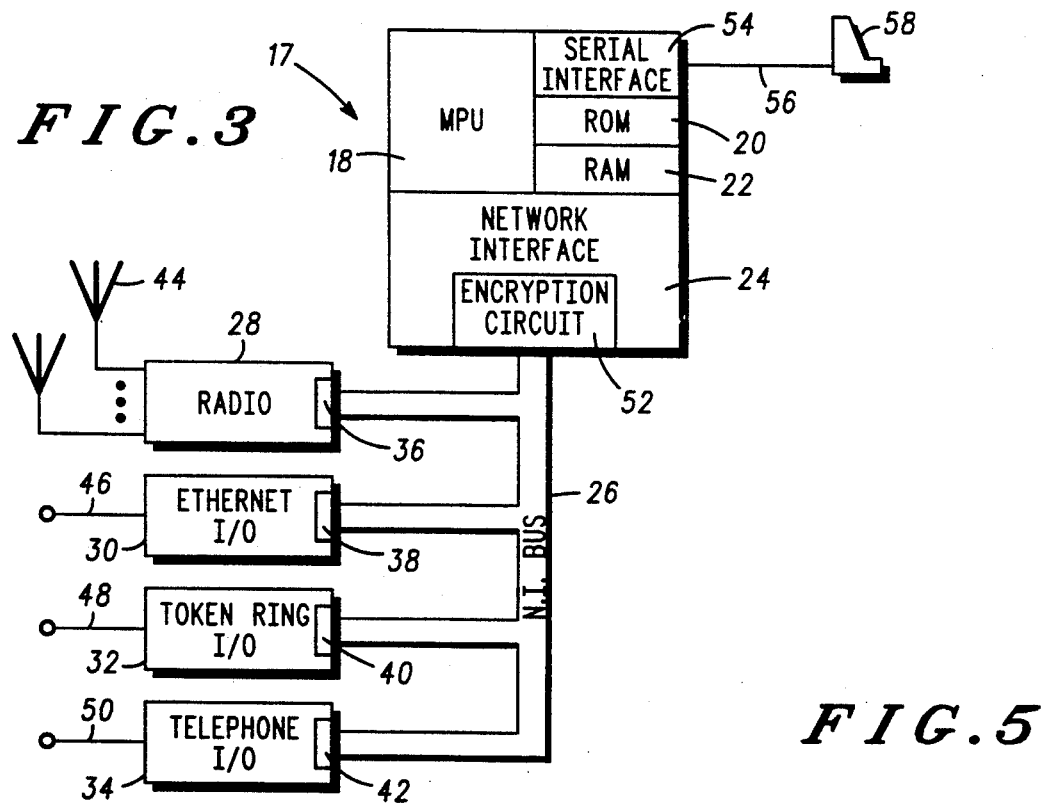
FIG.3
FIG.5
| 15 | 8 | 7 | 0 | |
|---|---|---|---|---|
| POLYNOMIAL 0-BYTE 0 | | POLYNOMIAL 0-BYTE 1 | | 0 |
| POLYNOMIAL 0-BYTE 2 | | POLYNOMIAL 0-BYTE 3 | | 2 |
| POLYNOMIAL 1-BYTE 0 | | POLYNOMIAL 1-BYTE 1 | | 4 |
| POLYNOMIAL 1-BYTE 2 | | POLYNOMIAL 1-BYTE 3 | | 6 |
| POLYNOMIAL 2-BYTE 0 | | POLYNOMIAL 2-BYTE 1 | | 8 |
| POLYNOMIAL 2-BYTE 2 | | POLYNOMIAL 2-BYTE 3 | | 10 |
| POLYNOMIAL 3-BYTE 0 | | POLYNOMIAL 3-BYTE 1 | | 12 |
| POLYNOMIAL 3-BYTE 2 | | POLYNOMIAL 3-BYTE 3 | | 14 |
500

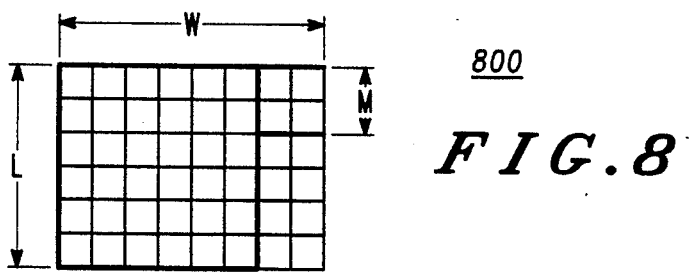
FIG.6
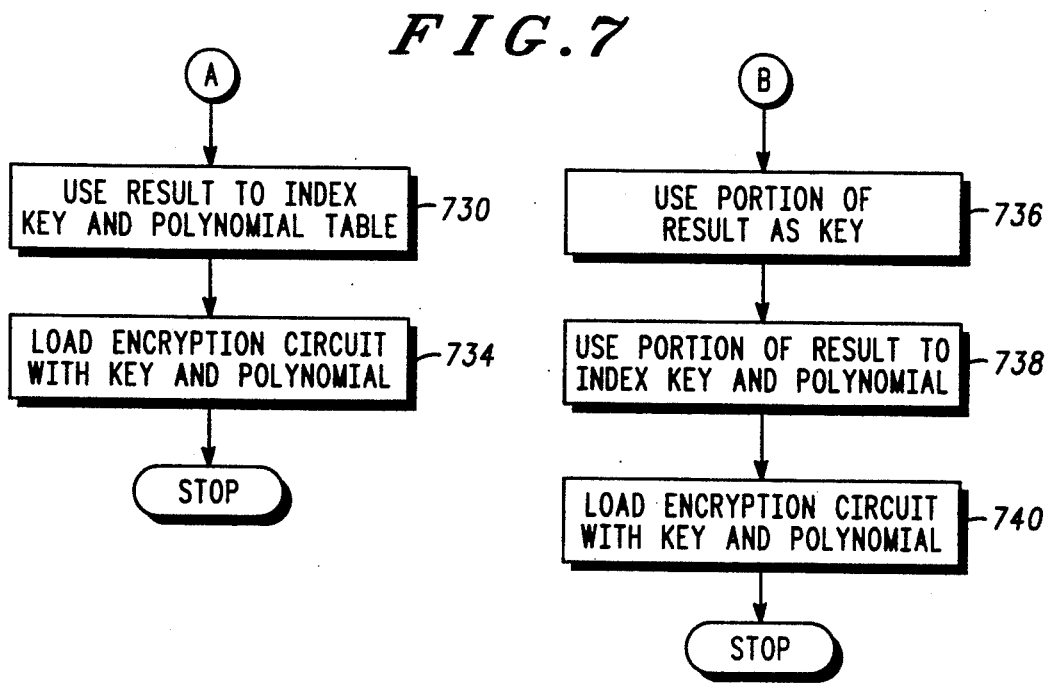

METHOD AND APPARATUS FOR RESTRICTING ACCESS WITHIN A WIRELESS LOCAL AREA NETWORK

FIELD OF THE INVENTION

This invention relates generally to wireless local area networks and particularly to a method and apparatus for restricting access within said network.

BACKGROUND OF THE INVENTION

Businesses which have adopted wireless Local Area Networks (LAN) transmit data using radio communications. Since this data may be of a proprietary nature, it should be kept secret. One solution is to restrict access within the network.

FIG. 1 illustrates a wireless LAN in which a control module (CM) 10 utilizes RF communications to communicate with user modules (UM) 12 that are each coupled to one or more user devices 14 consisting of a terminal, personal computer, telephone, or other information input/output device. In the illustrative system, the CM 10 is also coupled by a data channel 16 to a data network. The CM 10 controls communications within the illustrated network and passes information from the data network channel 16 to user devices 14 via an associated UM 12. The CM 10 also controls local communications by receiving information from one UM 12 and relaying the information to a different UM 12. The information is conveyed in the form of packets. The network to which the CM 10 is connected may consist of an Ethernet network, a Token Ring network, or any of the other of the well known voice and data networks.

Access to the wireless LAN is controlled by the CM. Each UM has a unique identification number such as, for example, an IEEE address. This information is stored in CM memory. Prior to permitting network access, the CM must verify the ID of each requesting UM. If the UM is registered in CM memory as an authorized user, the CM will provide service. If, however, the UM's identification number is not found, access is denied.

Whenever a UM moves from one geographic area of coverage (cell) to another, its ID must be deleted from the currently servicing CM and presented to the CM which controls communications within the new geographic area. This is currently a manual operation requiring the assistance of a network administrator. While this method is palatable in most single cell installations, it is extremely inefficient when used in a multiple cell (microcell) environment. The typical microcell installation is characterized by multiple users often segregated into distinct user groups covering diverse geographic areas. Quite frequently, the user within these groups desire mobility. This creates a need for a user access methodology which eliminates network administrator intervention and maximizes system flexibility by assuring ease of relocation, while maintaining high levels of security from unauthorized use.

SUMMARY OF THE INVENTION

The present invention provides user access capabilities within a wireless Local Area Network (LAN) having distinct user groups. In this effort, a password is entered into a UM seeking access within a user group. In response to the password, the UM selects a key and a polynomial. Thereafter, packets received by and transmitted from the UM are encrypted via the UM selected key and polynomial. Communications is permitted if the UM selected key and polynomial is identical to the key and polynomial used by the servicing CM. In the alternative, the key is generated as a function of the password, while the polynomial is selected from memory.

BRIEF DESCRIPTION OF THE DRAWINGS

FIG. 1 illustrates a wireless Local Area Network (LAN) suited for incorporating the present invention;

FIG. 3 is a block diagram of a control module and a user module in accordance with the present invention;

FIGS. 5 and 6 depict possible polynomial and key memory maps, respectively;

FIG. 8 depicts a possible table structure in accordance with the present invention.

DETAILED DESCRIPTION OF THE PREFERRED EMBODIMENT

Figure 2:
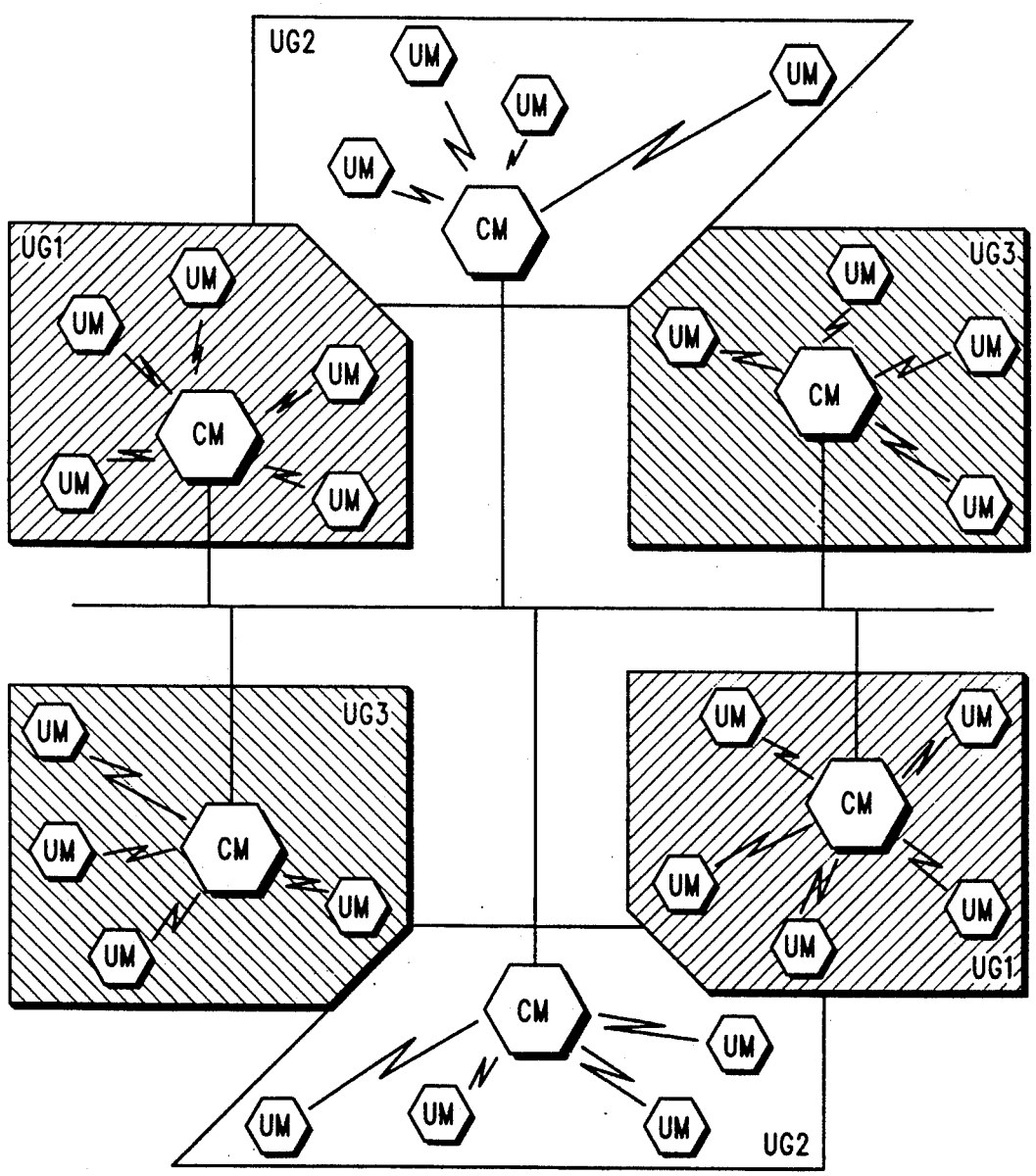
FIG. 2 illustrates the wireless LAN of FIG. 1 depicted in a microcell installation.

FIG. 2 illustrates a microcell installation of a wireless LAN in accordance with the present invention. This system comprises a plurality of distinct and separate user groups, identified as (UG 1-3). Assuming a typical in-building/office environment, we can say that user group 1 (UG 1) has access to financial information, user group 2 UG 2) is concerned with technological matters, while user group 3 (UG 3) is concerned solely with matters of marketing and advertising. Of course, this suggested segmentation is presented merely as an illustration that virtually any type of activity can be identified as worthy of requiring restricted access. As previously suggested, the data network 16 to which the CMs of each user group are connected may consist of an Ethernet network. Notwithstanding, sensitive user group information is still safeguarded.

Referring to FIG. 3, a block diagram of a UM 12 is illustrated. A communications controller 17 includes a microprocessor 18, with associated read only memory 20, random access memory 22, a serial interface 54, and a network interface 24. The serial interface 54 consists of appropriate registers and line drivers for communication with a terminal device 58 interconnected to the UM by the serial interface bus 56. In accordance with the preferred embodiment serial interface 54 is an RS232 interface, serial bus 56 is an RS232 bus and I/O device 58 may be any of the well known asynchronous RS232 terminals capable of providing a serial I/O function. While depicted as a permanent connection, terminal device 58 is only connected as shown during various administrative and maintenance operations requiring direct I/O to and from the UM 12. The network interface 24 consists of appropriate registers and line drivers for communication with the plurality of peripheral devices interconnected by the network interface (NI) bus 26. In addition, the network interface 24 comprises an encryption circuit 52 which encrypts packets of information transfered over the NI bus 26.

According to the physical structure of FIG. 3, a plurality of peripheral devices including two-way RF radio 28, an Ethernet I/O device 30, a Token Ring I/O device 32, and a telephone I/O device 34 are interfaced with the UM 12. Each peripheral 28-34 contains a NI bus interface 36, 38, 40 and 42, respectively. These interfaces provide the necessary registers and line drivers for communicating on the NI bus 26 and will also include an MPU, RAM, and ROM if these resources are not available in the integrated devices.

The radio 28 includes one or more antennas designated 44 for RF communications with a CM 10 as shown in FIGS. 1 and 2. The Ethernet I/O device 30 is coupled by wire 46 to a conventional Ethernet port. Likewise the Token Ring I/O device 32 is coupled by wire 48 to a conventional Token Ring network. The telephone I/O device 32 is connected by wire 50 to a telephone instrument. The illustrated peripherals are merely representative that virtually any type of packetized information can be coupled by means of an appropriate input/output device to UM 12. Each CM 10 will also take the configuration of FIG. 3.

While the preferred embodiment shows a NI bus 26 connecting the various peripherals together via the communications controller 17, it will be appreciated by those skilled in the art that the NI bus 26 can be substituted by a TDM bus, bidirectional buses or packet switches which are all known in the art. For additional information on the NI bus 26 and the general operation of a CM and a UM in accordance with FIG. 3, the interested reader may refer to U.S. Pat. Ser. No. 07/719,212, filed Jun. 21, 1991 and assigned to the assignee of the present application.

Figure 4:
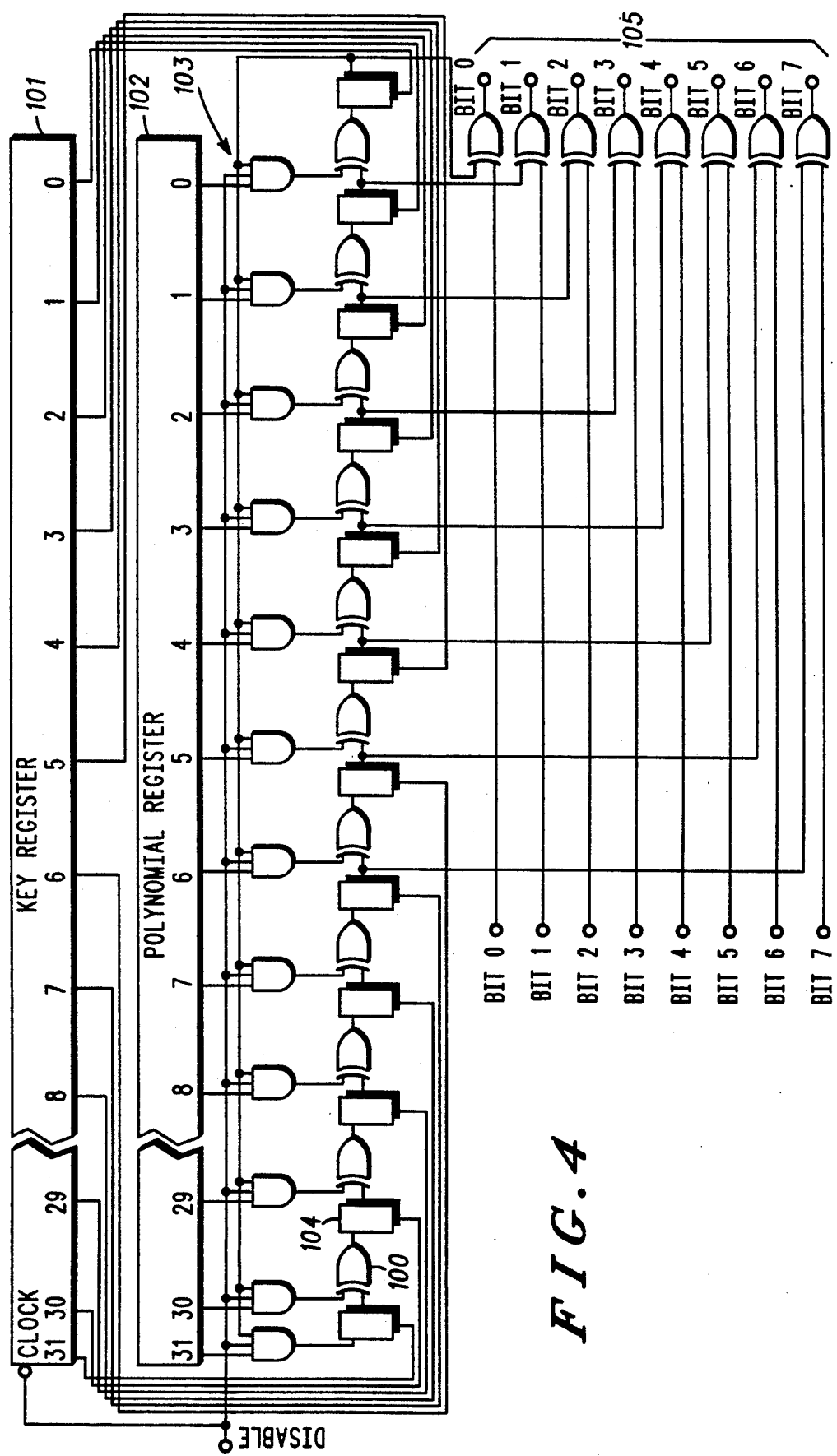
FIG. 4 is a detailed diagram of the encryption circuit of FIG. 3.

Referring to FIG. 4, a detailed diagram of the encryption circuit 52 of FIG. 3 is illustrated. This encryption/decryption circuit 52 includes two registers; one for a key (101) and one for a polynomial (102). The key and polynomial, which are predefined and stored in a table in ROM 20, determine if and how the data will be encrypted. If both the key and polynomial are zero, the encryption circuit will transmit the data without encrypting. If either one is a nonzero value, the circuit will encrypt/decrypt differently for different values.

Each output bit of the key register (101) is connected to an input of a parallel loading shift register (104). The shift register (104) must be the same length as the number of bits in the key. In the preferred embodiment, the key and polynomial are thirty-two bits in length. Alternate embodiments may have different length keys and polynomials and still operate properly.

Each output bit of the polynomial register (102) is connected to an input of a three input logical AND gate (103). The second input of each AND gate (103) is connected to a disable line that is also connected to the key register's clear input. The disable will clear the key register (101) and disable the polynomial to allow the input data to be transmitted through the encryption circuit without encryption/decryption. The third input of each AND gate (103) is connected to the output of the last stage of the shift register (104).

Each output bit of the shift register (104) is XOR'ed with the output of the corresponding AND gate (103). The output of the XOR gate is the shift-in input of the next stage of the shift register (104). In the preferred embodiment, the outputs of the last eight stages of the shift register (104) are XOR'ed with the data to be encrypted/decrypted. In alternate embodiments, any shift register stage of determinable width can be used as the input to the XOR gates. The outputs of these XOR gates (105) is the encrypted data.

The encryption circuit 52 operates by first loading the key register (101) with a key value and the polynomial (102) register with a polynomial value. The contents of the key register is then loaded into the shift register (104) prior to the time that the data is to be encrypted.

The polynomial will determine at which points the output of a stage of the shift register (104) will be XOR'ed with the output of the final stage of the shift register (104). A binary "1" in any polynomial bit position will allow that shift register bit to be XOR'ed (106) with the final stage's (104) output that has been fed back through the AND gate (103). The output of this XOR operation is shifted into the next stage of the shift register (104) on the next clock cycle. After each byte of input data is encrypted and output, the shift register is clocked to shift its contents down one bit to encrypt/decrypt the next byte of input data.

In the preferred embodiment, the shift registers are shifted a bit at a time. In an alternate embodiment, the shift register can be shifted a byte at a time. The rate at which the shift register is clocked can be programmable in another embodiment. For additional information on the encryption circuit of FIG. 4, the interested reader should refer to U.S. Pat. No. 5,008,938, issued Apr. 16, 1991 and assigned to the assignee of the present application.

FIGS. 5 and 6 depict representations of a polynomial memory map 500 and a key memory map 600, respectively. In accordance with one embodiment, identical maps are stored in the ROM 20 of each UM and CM of the wireless LAN system of the present invention. Since each map contains identical key and polynomial values, specific ROM addresses indicate a location in the memory maps of the key and polynomial values that are to be used to encrypt data packets in accordance with the description of FIG. 4.

Since the present invention does not pass key and polynomial information between UMs and CMs, a method for independently selecting the same key and polynomial is required. It will be appreciated by those skilled in the art that prior to UM key and polynomial selection, the CM and the UMs must be synchronized. Synchronization refers to the condition where the frames of a UM packet are time aligned with the frames of a CM packet.

In accordance with the present invention, each accessing UM receives CM transmitted packets. Within each packet is a synchronization signal field comprising CM timing information. Armed with this information, the UM then time aligns its operation with that of the CM. As previously stated, no key and polynomial information is passed between the UM and the CM. Consequently, the synchronization signal field of a CM packet transmission is either encrypted with known information or it is simply not encrypted. This allows the accessing UM to synchronize operation with a CM prior to commencing communications. For more information on the synchronization process, the interested reader may refer to U.S. Pat. Ser. No. 07/719,212, filed Jun. 21, 1991 and assigned to the assignee of the present application.

Figure 7:
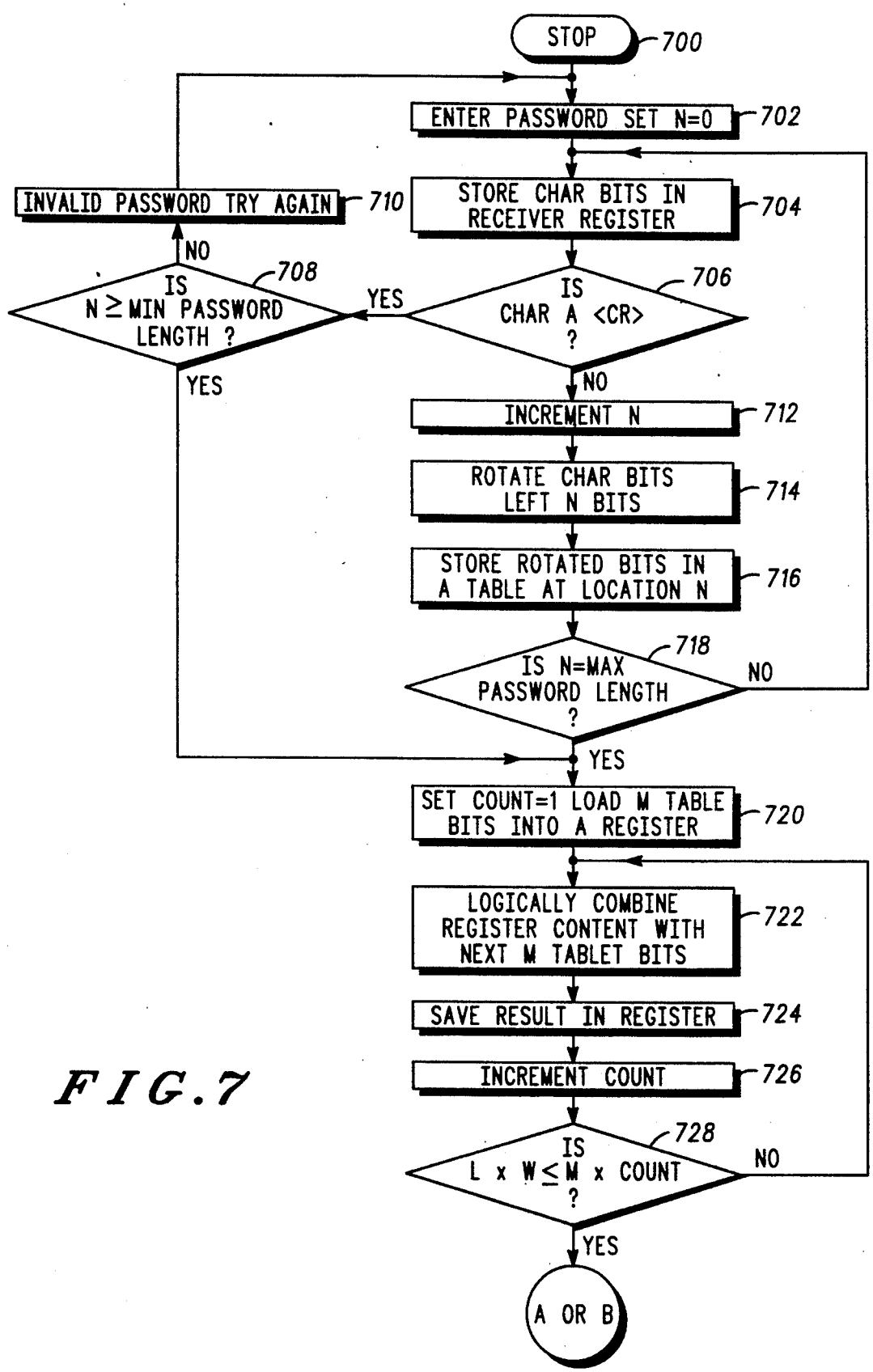
FIG. 7 depicts a flow chart diagram of the steps performed by a UM and a CM during key and polynomial selection and generation.

Referring to FIG. 7, a flow chart diagram illustrating the steps performed by a CM and a UM for selecting keys and polynomials is depicted. Starting at block 700 a password is entered into a UM or a CM at block 702 via terminal 58 of FIG. 3. As previously discussed the password is a character string, such as, for example, an ASCII character string having a length defined as N. For the purpose of delimitation, N has a Max and a Min value, thus at block 702, an N counter is set to zero.

While the preferred embodiment suggests the password is an ASCII character string, it will be appreciated that such password may also comprise any of the other well known character types which are capable of binary representation.

Flow proceeds to block 704 where the password characters are received and stored in a serial interface 54 register. At block 706, a decision is made to determine whether a received password character is a carriage return (<CR>). If so, flow proceeds to block 708 where a decision is made to determine whether the entered password exceeds the minimum character length. If it does not, flow branches to block 710, where an indication of an invalid password is given and permission to try again is granted. If the minimum password length has been surpassed, flow branches ahead to block 720.

Assuming the entered character is not a carriage return, flow proceeds to block 712 where N is incremented. Next, at block 714, the password character bit representation is rotated left by N bits and then stored in a table at location corresponding to N, at block 716. For example, assume the first received password character is a "3", with a binary representation of 0011. After rotation left by one bit, 0110 is stored in the first location of the table. If the second password character is a "3", after rotation left by two bits, 1100 is stored in the second table location. If the third password character is a "7", having a binary representation of 0111, after rotation left three bits at step 714, 1011 is stored in the third table location in step 716.

At block 718, a decision is made to determine whether the Max password character length has been exceeded. If not, flow branches back to block 704, where the next password character is treated in accordance with the preceding steps. This process continues until a carriage return is identified at block 706, or until the Max password character length is reached.

Referring to FIG. 8, a possible representation of a table 800 is shown. The table has multiple entries, each entry is W bits wide. In order to accommodate entries of variable length L, the table entire table should be initialized with known data, prior to the storage of rotated bits.

After all password character bit representations have been rotated and stored in a the table, the first M bits of the table are loaded into a register at block 720. In accordance with the present example, M is equal to 16 bits. Notwithstanding, it will be appreciated by those skilled in the art that M can be any number as a function of table 800 width W. Concurrent with step 720, a COUNT counter is set to one. At block 722, the register content is logically combined with the next M bits of table 800. The results are stored in a register at step 724. In accordance with the present invention, logical combinations may comprise any of the well known algebraic, Boolean and/or Modulo arithmetic operations, such as, but not limited to modulo-2 addition.

From block 724, flow proceeds to block 726 where the COUNT counter is incremented. Thereafter, a determination is made at block 728 whether the full table 800 contents have been employed during the logical combinations of step 722. If not, flow branches back to step 722 where more combinations are performed.

Upon exhaustion of the entire table 800 content, flow branches to block 730, where the results of the logical combinations are used to index key and polynomial values stored in memory map 500 and 600, respectively. Upon identification of the map locations to be used, the key and polynomial values therein are loaded into the encryption circuit of FIG. 4 at block 734.

In order to provide a UM and/or a CM with power surge protection, the selected key and polynomial may be stored in the non-volatile memory of RAM 22 of FIG. 3. This modification will permit system power down without the loss of current key and polynomial values. Monitoring the result registers will inform one whether the same key and polynomial are being used by a CM or a UM, without revealing what the actual values are.

In accordance with yet another embodiment, upon a YES determination at step 728, flow branches to block 736, where a portion of the result register content is used as a key, while another portion of the result register content is used as the polynomial map index. As a result, key values are generated as a function of the password at block 736, while the polynomial values are selected from memory at step 738. Thereafter, the generated key and the selected polynomial are loaded into the encryption circuit of FIG. 4 at block 740, prior to commencement of communications. If the same password is used at both a CM and a UM, identical key and polynomial values will be selected and/or generated, thereby assuring similar encryption and enhanced communications, without passing key and polynomial values there between.

We claim:

1. In a wireless Local Area Network (LAN) having distinct user groups, each user group having at least one control module (CM) and a plurality of user modules (UM) which communicate by transmitting and receiving packets of information, a method for establishing user module (UM) access comprising the steps of:

entering a password Into a UM seeking access within a LAN user group;

selecting a key and a polynomial as a function of the password;

encrypting packets received by and transmitted from the UM via the selected key and polynomial; and permitting the UM to communicate within the user group if the selected key and polynomial is identical to that used by the at least one control module.

2. The method of claim 1 further comprising the step of synchronizing the UM's operation with the at least one CM prior to permitting the UM to communicate within the user group.

3. The method of claim 1 wherein the step of entering a password comprises entering a character string representable in binary form.

4. The method of claim 1 wherein the step of selecting a key and a polynomial further comprises the steps of:

storing a number of keys and polynomials in UM memory;

receiving a password character bit representation;

rotating the password character bit representation left, as a function of the character's location in the password;

storing the rotated bit representation in a table, as a function of the character's location in the password;

logically combining the table content together to generate an index; and accessing a key and a polynomial from memory as a function of the index.

5. The method according to claim 4 further comprising the steps of:
   segmenting rotated bit patterns into groups ; and
   logically combining the groups together to define an index.

6. The method of claim 1 further comprising the steps of generating a key and selecting a polynomial from memory as a function of the password.

7. The method according to claim 6 wherein the step of generating a key comprises the steps of:
   receiving a password character bit representation;
   rotating the password character bit representation left, as a function of the character's location in the password;
   storing the rotated bit representation in a table, as a function of the character's location in the password;
   logically combining the table content together to generate a bit string;
   utilizing a first portion of the bit string as a key; and
   utilizing a second portion of the bit string as an index 8. The method of claim 1 wherein key and polynomial values are not transmitted between the CM and a UM.

9. In a wireless time division multiplexed Local Area Network (LAN) having distinct user groups, each user group having a unique password, at least one control module (CM) and a plurality of user modules (UM) which communicate by transmitting and receiving packets of information, a method for establishing user module (UM) access comprising the steps of:
   entering the user group password into each user group CM;
   selecting a CM key and polynomial as a function of the password;
   encrypting at least a portion of a packet received by or transmitted from the CM via the selected key and polynomial;
   entering the user group password into a UM seeking access within that user group;
   selecting a UM key and a polynomial as a function of the password;
   encrypting packets received by and transmitted from the UM via the UM key and polynomial; and
   permitting the UM to communicate within the user group if the selected UM key and polynomial is identical to the key and polynomial selected by the CM.

10. The method of claim 9 further comprising the step of synchronizing the UM's operation with that of the at least one CM prior to permitting the UM to communicate within the user group.

11. The method according to claim 10 wherein the step of synchronizing further comprises the step of
   receiving, at a UM, a packet transmitted from the at least one CM;
   detecting a synchronization signal field within the received packet, said field comprising CM timing information; and
   time aligning the UM's operation with that of the at least one CM prior to permitting the UM to communicate within the user group.

12. The method according to claim 11 wherein the step of detecting a synchronization signal field further comprises the step of using a known key and polynomial for transmission by the CM and reception by the UM of the synchronization signal field.

13. The method of claim 9 wherein the steps of selecting a CM key and polynomial and selecting a UM key and polynomial further comprise selecting identical CM and UM keys and polynomials if the entered passwords are the same.

14. The method of claim 9 further comprising the steps of:
   generating a UM key and selecting a UM polynomial from UM memory as a function of the password; and
   generating a CM key and selecting a CM polynomial from CM memory as a function of the password,
   whereby the generated and selected CM and UM keys and polynomials are identical if the entered passwords are the same.

15. The method according to claim 9 further comprising the steps of:
   relocating a UM for communication with a different CM within the same user group; and
   permitting the relocated UM to communicate with the different CM without entering the user group password.

16. The method according to claim 9 further comprising the steps of:
   relocating a UM for communication with a CM of a different user group;
   entering a different user group password into the UM seeking access within the different user group;
   selecting a UM key and a polynomial as a function of the password;
   encrypting packets received by and transmitted from the UM via the selected key and polynomial; and
   permitting the UM to communicate with CM's within that user group if the selected UM key and polynomial is identical to a key and polynomial used by the user group CMs.

17. A wireless Local Area Network (LAN) having distinct user groups, each user group having at least one control module (CM) and a plurality of user modules (UM) which communicate by transmitting and receiving packets of information, said network comprising at least one UM having:
   means for entering a user group password into said at least one UM;
   means, responsive to the password, for selecting a key and a polynomial;
   means, coupled to said UM and responsive to packets received from a CM, for synchronizing the UM's operation;
   means, coupled to said UM, for encrypting packets received by and transmitted from the UM via the selected key and polynomial; and
   means, coupled to said UM, for permitting the UM to communicate within the user group if the key and polynomial selected by the UM is identical to that used by the at least one CM.

18. The UM of claim 17 further comprising:
   means for generating a key as a function of the user group password.

19. A wireless time division multiplexed Local Area Network (LAN) having distinct user groups, each user group having a unique password, at least one control module (CM) and a plurality of user modules (UM) which communicate by transmitting and receiving packets at time slots within a frame, said network comprising:

said at least one CM having:
- means for receiving the user group password,
- means, responsive to the password, for selecting a CM key and polynomial,
- means, coupled to the CM, for encrypting at least a portion of a packet received by or transmitted from the CM via the selected key and polynomial, and
- means, coupled to the encrypting means, for transmitting encrypted packets; and at least one UM having:
- means for receiving the user group password,
- means, responsive to the password, for selecting a UM key and polynomial,
- means, coupled to the UM, for receiving CM encrypted packets,
- means, coupled to the packet receiving means for synchronizing UM operation to CM timing, and
- means, coupled to the UM, for decrypting CM encrypted packets and encrypting UM transmitted packets via the UM selected key and polynomial, such that the UM is permitted to communicate with the CM if the key and polynomial selected by the UM is identical to the key and polynomial selected by the CM.

20. The UM and the CM of claim 19 further comprising:
means for generating a key as a function of the user group password.

* * * * *

UNITED STATES PATENT AND TRADEMARK OFFICE
CERTIFICATE OF CORRECTION

PATENT NO. : 5,199,072

DATED : March 30, 1993

INVENTOR(S) : White et al.

It is certified that error appears in the above-identified patent and that said Letters Patent is hereby corrected as shown below:

Please correct the drawings as follows.

Block 700 on Title page and FIG. 7 on sheet 5 of 5 should read START not STOP.

Signed and Sealed this

Fifth Day of April, 1994

Attest:

BRUCE LEHMAN

*Attesting Officer*    Commissioner of Patents and Trademarks